Patented Mar. 31, 1936

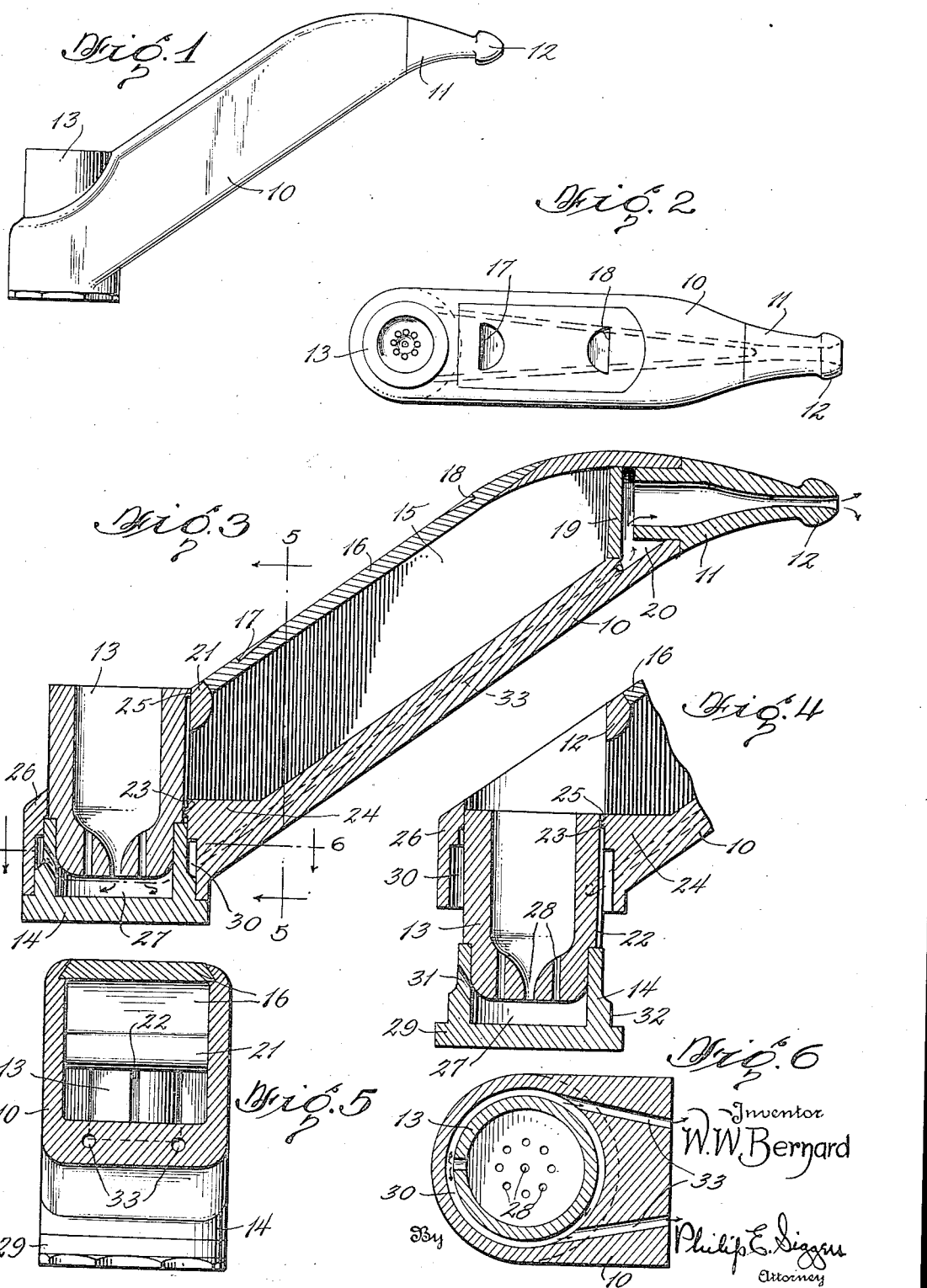

2,035,783

UNITED STATES PATENT OFFICE 2,035,783

SMOKER

Walter W. Bernard, Greeneville, Tenn.

Application April 6, 1935, Serial No. 15,088

5 Claims. (Cl. 131—12)

This invention relates to pipes or smokers and among other objects aims to provide an improved device which may be smoked like a pipe and which may supply sufficient tobacco for a number of consecutive smokes before refilling. The present invention is an improvement over the invention described and claimed in my application, Serial No. 733,693, filed July 3, 1934, allowed September 25, 1934, renewed and reallowed on October 3, 1935. Further objects and advantages of the invention will be pointed out in the following description of a preferred embodiment of the same.

In the accompanying drawing forming a part of this specification:—

Fig. 1 is a perspective view of the improved smoker;

Fig. 2 is a top plan view thereof;

Fig. 3 is a longitudinal vertical section on an enlarged scale;

Fig. 4 is a fragmentary section similar to Fig. 3 but showing only the bowl end of the smoker, with the bowl depressed for refilling;

Fig. 5 is a section on line 5—5 of Fig. 3; and

Fig. 6 is a section on line 6—6 of Fig. 3.

Referring particularly to the drawing there is shown a smoker comprising a body 10, a removable stem 11 having a mouthpiece 12, a bowl 13 and a bowl carrier 14. Preferably the body 10 is hollow to provide an interior chamber 15 which is large enough to hold pipe tobacco sufficient to fill the bowl 13 at least five or six times. The chamber or magazine 15 is closed by a lid 16 which is preferably slidable in the top of the body 10, having a close sliding fit with the walls of the body 10 as best shown in Fig. 5. Finger notches 17, 18 provide means to facilitate sliding of the lid in both directions. A plug 19 provides a wall closing the upper end of the chamber 15, said plug being cemented or otherwise permanently secured within the body 10. The stem 11 is preferably frictionally held within one end of the body 10 which is open and which is shaped to provide an air space 20, as shown in Fig. 3; however, the stem 11 may be screw threaded into the end of the body, or may be otherwise secured. A rib 21 provides a lower stop or abutment for the sliding lid 16.

The bowl 13 is adapted to be reciprocated vertically so that its mouth will be depressed to a position where it will receive tobacco by gravity from the chamber 15 and hence said bowl is provided with a longitudinal groove or channel 22 in which a lug 23 fits, said lug being provided on the thickened lower portion 24 of the body 10. A stop 25 at the upper end of the bowl is adapted to contact with the lug 23, as shown in Fig. 4, to prevent the bowl from falling off the body 10. If desired, a similar stop may be formed on the opposite side of the bowl to engage with an abutment (not shown) on the bowl-guiding member 26, which is on the lower end of the body 10. The bowl is adapted to snugly fit between the guide 26 and the thickened portion 24, as will be understood from Figs. 3 and 4, and the stop 25 and lug 23 are so located relative to each other that when the bowl 13 is depressed, its mouth is substantially on a level with the upper wall of the portion 24, so that tobacco may roll or fall down the open mouth of the chamber 15 to fill the bowl 13 with a fresh supply. When the bowl is in its normal or smoking position, one wall thereof completely closes the lower end of the chamber 15, as shown in Fig. 3.

The bowl 13 snugly fits within the bowl carrier 14, as clearly shown, and said bowl carrier 14 has an air space 27 beneath the bowl and in communication therewith through the perforations 28. The lower end of the bowl carrier has a flange 29 which facilitates the insertion and removal of the bowl carrier into the annular socket 30 provided in the lower end of the body 10. The annular socket 30 provides a smoke space and communicates with the air space 27 by means of the duct 31. While the bowl fits very snugly into its carrier 14, said carrier may be removed, if desired, by a simple twisting motion; or if preferred, the bowl carrier may be screw-threaded within the bottom of the body 10, although the construction shown is preferred. It will be understood that when a frictional fit is provided, the wall 32 of the carrier will have a very close clearance from the outer wall of the annular space 30. However, said wall 32 does not extend for the full length or height of the carrier, but is reduced in diameter so as to provide air space 30, mentioned above. One or more ducts 33 extending longitudinally of the body in the lower thickened wall thereof, provide conduits for the smoke to travel from the air chamber 27 below the bowl to the mouth piece 11, traversing the air pocket 20, which is adjacent the inner end of the stem.

The described smoker not only has the advantage of providing the user with a number of smokes without replenishing his supply of tobacco, thus assuring the steady smoker the pleasure of continuous puffing on his pipe for several hours, but also provides an easily cleaned pipe which is so constructed that slugs may never find their way into the mouth. Furthermore, the construction is such as to insure a very cool smoke which would be particularly enjoyed by the habitual tobacco user.

Obviously, the present invention may be embodied in several forms neither shown nor described.

Having described a preferred embodiment of my invention, what I claim as new and desire to secure by Letters Patent is:—

1. A smoker comprising, in combination, a body having a relatively large interior which is hollow to receive and store a supply of pipe tobacco; a stem at one end of said body; a bowl reciprocable vertically in the other end of the body to permit it to be depressed until its mouth may receive a supply of tobacco moving by gravity downwardly from the storage space within the body; and a smoke duct connecting said bowl and said stem.

2. A smoker comprising, in combination, a body having an opening in one end; a bowl carried by said body so as to be slidable vertically in said opening; said body having a tobacco-holding chamber in its interior; an opening in the top of said body giving access to said chamber; a slidable lid closing said opening; a duct extending longitudinally in the wall of said body; a stem communicating with one end of said duct and being fixed on one end of said body; and means connecting the other end of said duct with said bowl, so that tobacco in said bowl may be smoked.

3. A smoker comprising, in combination, a body; means in the body for holding a supply of pipe tobacco; a smoke duct in the body which is cut off from communication with the tobacco-holding means; a stem on the body communicating with the smoke duct; a bowl communicating with said smoke duct; and a bowl carrier receiving said bowl and slidable vertically on the body, so that said bowl may be refilled from the supply of tobacco within the body.

4. A smoker comprising, in combination, a body having an interior chamber for holding pipe tobacco; a bowl; a bowl carrier beneath the bowl and surrounding the lower portion of the same; said bowl and carrier together being reciprocable so as to place the bowl in position to be supplied with fresh tobacco from said chamber; said carrier having an air space beneath the bowl and communicating therewith; a duct formed in the body communicating with said air space; and a stem on the body communicating with said duct.

5. A smoker comprising, in combination, a body having a tobacco-holding chamber in its interior; a pipe stem at one end of the body; a bowl at the other end, and being slidable vertically relative to said body; a bowl carrier beneath the bowl and frictionally engaging said body and so shaped as to hold said bowl and also to provide an air chamber beneath the bowl and further to provide an annular space between the body and the outer wall of said carrier; and conduit means joining the pipe stem, said annular space, said air chamber and said bowl.

WALTER W. BERNARD.